United States Patent
Hatano et al.

(10) Patent No.: US 11,909,273 B2
(45) Date of Patent: Feb. 20, 2024

(54) ACTUATOR

(71) Applicant: NIDEC SANKYO CORPORATION, Nagano (JP)

(72) Inventors: Shinji Hatano, Nagano (JP); Kazuhiko Yanagisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 149 days.

(21) Appl. No.: 17/707,967

(22) Filed: Mar. 30, 2022

(65) Prior Publication Data
US 2022/0320931 A1    Oct. 6, 2022

(30) Foreign Application Priority Data
Apr. 2, 2021    (JP) ................. 2021-063217

(51) Int. Cl.
*H02K 1/34*    (2006.01)
*H01F 7/08*    (2006.01)
*H02K 33/18*    (2006.01)

(52) U.S. Cl.
CPC ............... *H02K 1/34* (2013.01); *H01F 7/081* (2013.01); *H02K 33/18* (2013.01)

(58) Field of Classification Search
CPC .......... H02K 1/34; H02K 33/18; H02K 33/16; H01F 7/081; H01F 2007/086; H01F 7/1646; G06F 3/016
See application file for complete search history.

(56) References Cited

U.S. PATENT DOCUMENTS

| | | | | |
|---|---|---|---|---|
| 2019/0190365 A1* | 6/2019 | Takeda | ................. | H02K 33/18 |
| 2019/0305630 A1* | 10/2019 | Mori | ................. | H01F 27/2823 |
| 2020/0204054 A1 | 6/2020 | Mori | | |
| 2021/0005370 A1* | 1/2021 | Yan | ................. | H01F 7/16 |
| 2022/0247295 A1* | 8/2022 | Takei | ................. | H02K 9/223 |
| 2022/0352801 A1* | 11/2022 | Kitahara | ................. | H02K 33/16 |

FOREIGN PATENT DOCUMENTS

JP         2020102902         7/2020

* cited by examiner

*Primary Examiner* — Bernard Rojas
(74) *Attorney, Agent, or Firm* — JCIPRNET

(57) ABSTRACT

An actuator includes a support body, a movable body, a connection body, and a magnetic drive mechanism having a coil and a magnet for relatively moving the support body and the movable body. A winding part of the coil includes effective side portions, a first curved side portion connecting one side ends of the effective side portions, and a second curved side portion connecting the other side ends of the effective side portions. The magnet faces the effective side portions of the coil. A yoke fixed to the magnet includes a first yoke, a second yoke, a one side connection yoke and the other side connection yoke connecting the first yoke with the second yoke, and the one side connection yoke and the other side connection yoke are provided at positions so as not to overlap with the effective side portions and the magnet.

7 Claims, 8 Drawing Sheets

ACTUATOR

CROSS REFERENCE TO RELATED APPLICATION

The present invention claims priority under 35 U.S.C. § 119 to Japanese Application No. 2021-063217 filed Apr. 2, 2021, the entire content of which is incorporated herein by reference.

TECHNICAL FIELD

At least an embodiment of the present invention may relate to an actuator structured to move a movable body by a magnetic drive mechanism having a coil and a magnet.

BACKGROUND

As a device for notifying information by vibration, an actuator has been proposed which is structured to vibrate a movable body supported in a support body by a magnetic drive mechanism. An actuator disclosed in Japanese Patent Laid-Open No. 2020-102902 (Patent Literature 1) includes a movable body having a magnet and a yoke, a support body having a coil, and a connection body which relatively movably connects the movable body with the support body. The magnet faces a winding part of the coil, and the magnet and the coil structure a magnetic drive mechanism structured to relatively move the movable body and the support body in a predetermined moving direction. The moving direction is a direction perpendicular to a facing direction in which the magnet and the winding part face each other. The winding part is provided with a pair of effective side portions, which are arranged in the moving direction and are extended in an orthogonal direction perpendicular to the moving direction and the facing direction, and a pair of curved side portions which respectively connect both ends in the orthogonal direction of a pair of the effective side portions with each other.

The actuator disclosed in Patent Literature 1 includes, as the magnet, a first magnet located on one side with respect to the coil and a second magnet located on the other side with respect to the coil. Further, the actuator includes, as the yoke, a first yoke located on an opposite side of the first magnet with respect to the coil, a second yoke located on an opposite side of the second magnet with respect to the coil, and a pair of connection yokes which connect the first yoke with the second yoke on both sides of a coil holder in the moving direction. When provided with the above-mentioned structure, in the actuator, magnetic flux from the first magnet and magnetic flux from the second magnet flow so as to surround the coil according to a shape of the yoke. As a result, the magnetic flux from the magnet is restrained from leaking to the outside of the yoke and thus, the magnetic drive mechanism is capable of securing thrust for relatively moving the support body and the movable body.

In the Patent Literature 1, a pair of the connection yokes are overlapped with the winding part of the coil when viewed in the moving direction. Therefore, a pair of the connection yokes are located on both sides in the moving direction of a holding part of the coil holder which holds the winding part of the coil.

As thrust of the magnetic drive mechanism, in order to obtain larger thrust, it is conceivable that a facing area where the effective side portions of the coil and a magnet face each other is increased. For example, it is conceivable that, as the coil, a coil is adopted in which a width of its effective side portion is larger than a conventional coil in the moving direction, and that a magnet having a size capable of facing the effective side portion of the coil is mounted on the movable body. However, in this case, a size of the holding part of the coil holder which holds the coil is required to increase in the moving direction by an increasing amount of the coil in the moving direction.

In the actuator described in Patent Literature 1, a pair of the connection yokes structuring the movable body are located on both sides in the moving direction with respect to the holding part of the coil holder which holds the coil. Therefore, when the coil holding part of the coil holder becomes larger in the moving direction by adopting a large coil, a separated distance in the moving direction of a pair of the connection yokes is required to increase compared with a conventional yoke. In a case that a distance between a pair of the connection yokes becomes larger in the moving direction, the movable body also becomes larger in the moving direction and thus, the actuator becomes larger in the moving direction.

SUMMARY

At least an embodiment of the present invention may advantageously provide an actuator which is capable of restraining increase of its size in a moving direction even in a case that a large coil is mounted as a coil of a magnetic drive mechanism.

According to at least an embodiment of the present invention, there may be provided an actuator including a support body having a coil and a coil holder which holds the coil, a movable body having a magnet facing the coil and a yoke to which the magnet is fixed, a connection body which relatively movably connects the movable body with the support body, and a magnetic drive mechanism having the coil and the magnet to move the support body and the movable body relatively. In a case that a direction where the coil and the magnet face each other is defined as a first direction, a direction where the movable body and the support body are relatively moved is defined as a second direction which is perpendicular to the first direction, and a direction perpendicular to the first direction and the second direction is defined as a third direction, a winding part of the coil is provided with a pair of effective side portions which are arranged in the second direction and extended in the third direction, a first curved side portion which connects one side ends in the third direction of the pair of the effective side portions, and a second curved side portion which connects the other side ends in the third direction of the pair of the effective side portions. Further, the magnet faces the pair of the effective side portions and includes a first magnet located on one side with respect to the coil in the first direction and a second magnet located on the other side with respect to the coil in the first direction. The yoke includes a first yoke located on an opposite side of the first magnet with respect to the coil, a second yoke located on an opposite side of the second magnet with respect to the coil, a one side connection yoke which is extended in the first direction on one side in the second direction of the coil holder to connect the first yoke with the second yoke, and the other side connection yoke which is extended in the first direction on the other side in the second direction of the coil holder to connect the first yoke with the second yoke. The one side connection yoke and the other side connection yoke are provided at positions so as not to overlap with the effective side portions and the magnet when viewed in the second direction.

The actuator in accordance with at least an embodiment of the present invention includes, as a magnet structuring a magnetic drive mechanism together with a coil, a first magnet located on one side with respect to the coil in the first direction and a second magnet located on the other side with respect to the coil in the first direction. Further, the actuator includes, as a yoke, a first yoke located on an opposite side of the first magnet with respect to the coil, a second yoke located on an opposite side of the second magnet with respect to the coil, a one side connection yoke which is extended in the first direction on one side in the second direction of the coil holder to connect the first yoke with the second yoke, and the other side connection yoke which is extended in the first direction on the other side in the second direction of the coil holder to connect the first yoke with the second yoke. According to this structure, magnetic flux from the first magnet and magnetic flux from the second magnet flow so as to surround the coil according to a shape of the yoke. As a result, the magnetic flux from the magnet is restrained from leaking to the outside of the yoke and thus, the magnetic drive mechanism of the actuator is capable of easily obtaining thrust which relatively moves the support body and the movable body. In this case, the one side connection yoke and the other side connection yoke are provided at positions so as not to overlap with the effective side portions of the coil and the magnet when viewed in the second direction. Therefore, in order to increase an area of the effective side portions of the coil facing the magnet, even in a case that a coil which is larger in the second direction than a conventional coil is mounted on the coil holder and that a size of a holding part which holds the winding part in the coil holder is increased in the second direction by an amount that a size of the coil is increased in the second direction, the one side connection yoke and the other side connection yoke are not required to be separated from each other in the moving direction. Accordingly, even in a case that a large coil is mounted as the coil of the magnetic drive mechanism, the actuator is prevented or restrained from enlarging in the moving direction.

In at least an embodiment of the present invention, it may be structured that the one side connection yoke is provided with a first one side connection yoke and a second one side connection yoke which are provided on both sides in the third direction with respect to the magnet and connect the first yoke with the second yoke, and the other side connection yoke is provided with a first other side connection yoke and a second other side connection yoke which are provided on both sides in the third direction with respect to the magnet and connect the first yoke with the second yoke. According to this structure, the one side connection yoke which connects the first yoke and the second yoke with each other is provided with two connection yokes, i.e., the first one side connection yoke and the second one side connection yoke, and the other side connection yoke is provided with two connection yokes, i.e., the first other side connection yoke and the second other side connection yoke. Therefore, magnetic flux from the first magnet and magnetic flux from the second magnet easily flow so as to surround the coil.

In at least an embodiment of the present invention, it is desirable that the first one side connection yoke and the first other side connection yoke are overlapped with the first curved side portion when viewed in the second direction, and the second one side connection yoke and the second other side connection yoke are overlapped with the second curved side portion when viewed in the second direction. According to this structure, two yokes of the first one side connection yoke and the second one side connection yoke structuring the one side connection yoke are prevented from excessively separating from each other in the third direction. Further, two yokes of the first other side connection yoke and the second other side connection yoke structuring the other side connection yoke are prevented from excessively separating from each other in the third direction. Therefore, a size of the actuator is prevented or restrained from increasing in the third direction.

In at least an embodiment of the present invention, it may be structured that the coil holder is provided with a plate part whose thickness direction is directed in the first direction and a coil arrangement hole provided in the plate part, the coil arrangement hole is formed in a shape that the winding part is fitted when viewed in the first direction, and the winding part is accommodated in the coil arrangement hole. In addition, the plate part is provided with a pair of first cut-out parts which are recessed to an inner side from both end edges in the second direction at positions overlapping with the first curved side portion when viewed in the second direction, and a pair of second cut-out parts which are recessed to an inner side from both end edges in the second direction at positions overlapping with the second curved side portion when viewed in the second direction. Each of the first one side connection yoke and the first other side connection yoke is inserted into each of the first cut-out parts, and each of the second one side connection yoke and the second other side connection yoke is inserted into each of the second cut-out parts. According to this structure, even in a case that the one side connection yoke and the other side connection yoke are located on an outer side with respect to the coil holder in the second direction, the movable body is easily restrained from enlarging in the second direction.

In at least an embodiment of the present invention, it may be structured that a first width in the second direction of a first portion of the plate part located between a pair of the first cut-out parts and a pair of the second cut-out parts in the third direction is wider than a second width in the second direction of a second portion located between a pair of the first cut-out parts in the second direction and a third width in the second direction of a third portion located between a pair of the second cut-out parts in the second direction, and the second width and the third width are smaller than an inside diameter in the second direction of the coil arrangement hole in the first portion. According to this structure, a portion of the coil arrangement hole where the effective side portions of the coil are accommodated is provided in the first portion whose width in the second direction is wide. Therefore, the portion of the coil arrangement hole where the effective side portions of the coil are accommodated can be increased in the second direction. Accordingly, a size of the coil is easily increased in the second direction.

In at least an embodiment of the present invention, it may be structured that the support body includes a plate in a flat plate shape which is overlapped with an end face on the other side in the first direction of the plate part to close the coil arrangement hole, each of the first one side connection yoke and the first other side connection yoke is provided with a connecting portion which is extended in the first direction on an inner side of the first cut-out part to connect the first yoke with the second yoke, and a protruded portion which is protruded from an end portion of the connecting portion on a side of the second yoke toward the first portion in the third direction and faces the plate with a predetermined gap space therebetween in the first direction. According to this structure, in a case that the movable body is excessively inclined in the second direction, the plate of the support body and the protruded portion of the first one side connection yoke or the protruded portion of the first other side connection yoke are abutted with each other. Therefore, the movable body can be prevented from excessively inclining when the movable body is moved.

In at least an embodiment of the present invention, it may be structured that the support body includes a case in a tube shape which is provided with a first plate part which is located on one side in the first direction with respect to the coil holder and the movable body, a second plate part which is located on the other side in the first direction with respect to the coil holder and the movable body, and a pair of side plate parts which are extended in the first direction to respectively connect both end edges in the second direction of the first plate part with both end edges in the second direction of the second plate part. Each of a pair of the side plate parts is provided with an opening part which penetrates in the second direction, and both end portions in the second direction of the first portion are inserted into a pair of the opening parts. According to this structure, in comparison with a case that the coil holder is accommodated between a pair of the side plate parts, a size of the first portion of the coil holder can be increased in the second direction by at least an amount of a thickness of a pair of the side plate parts of the case. Therefore, the coil arrangement hole for accommodating the coil whose size in the second direction is large is easily provided in the coil holder.

Effects of the Invention

In the actuator in accordance with at least an embodiment of the present invention, the yoke to which the magnet is fixed surrounds the coil of the support body. Therefore, magnetic flux from the magnet flows so as to surround the coil according to a shape of the yoke. As a result, the magnetic flux from the magnet is restrained from leaking to the outside of the yoke and thus, the magnetic drive mechanism of the actuator is capable of easily obtaining thrust which relatively moves the support body and the movable body. Further, the one side connection yoke and the other side connection yoke which are located on both sides in the second direction of the coil holder which holds the coil are provided at positions so as not to overlap with the effective side portions of the coil and the magnet when viewed in the second direction. Therefore, in order to increase an area of the effective side portions of the coil facing the magnet, even in a case that a coil which is larger in the second direction than a conventional coil is mounted on the coil holder and that a size of a holding part which holds the winding part in the coil holder is increased in the second direction by an amount that a size of the coil is increased in the second direction, the one side connection yoke and the other side connection yoke are not required to be separated from each other in the moving direction. Accordingly, even in a case that a large coil is mounted as the coil of the magnetic drive mechanism, the actuator is prevented or restrained from enlarging in the moving direction.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an actuator to which the present invention is applied will be described below with reference to the accompanying drawings. Further, a manufacturing method of the actuator will be described below.

(Entire Structure)

Figure 1:
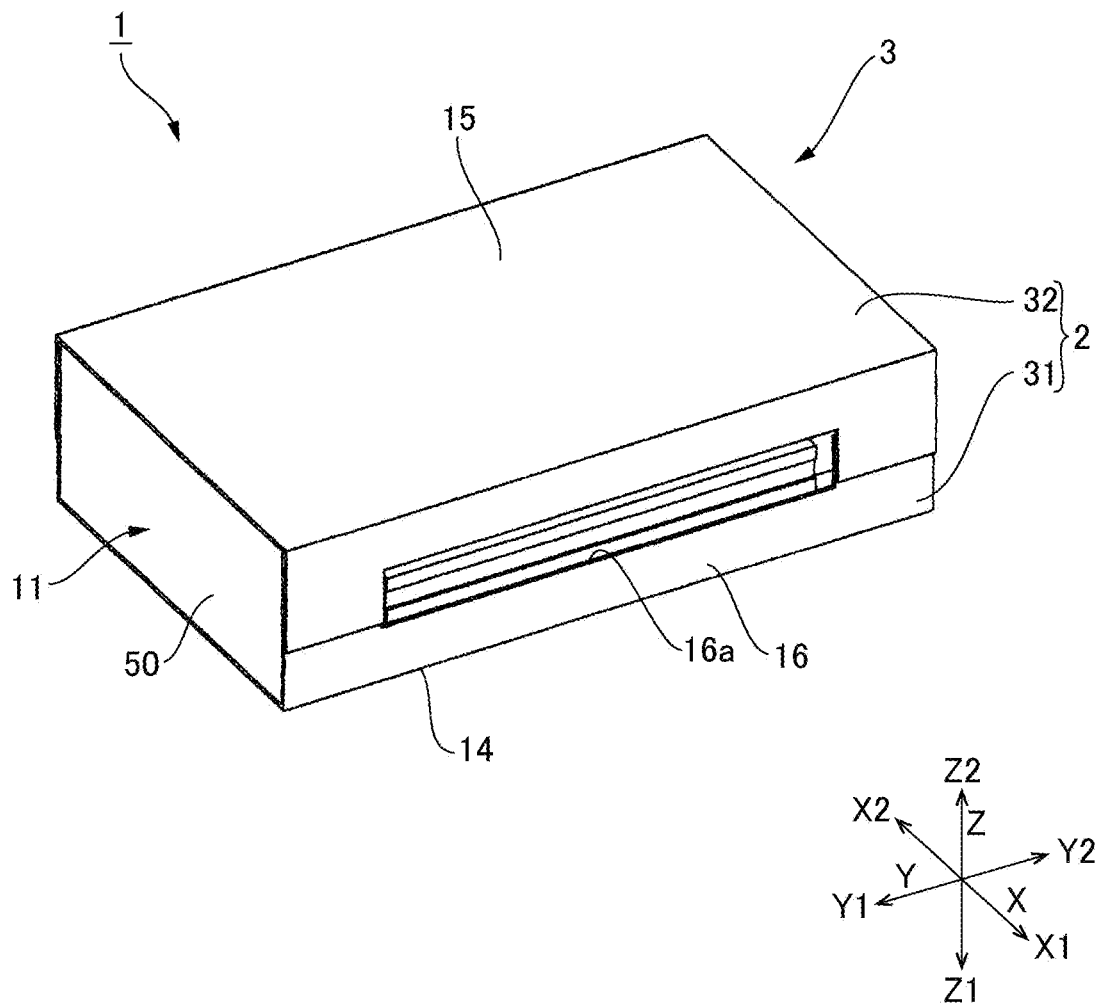
FIG. 1 is a perspective view showing an actuator to which the present invention is applied.
Figure 2:
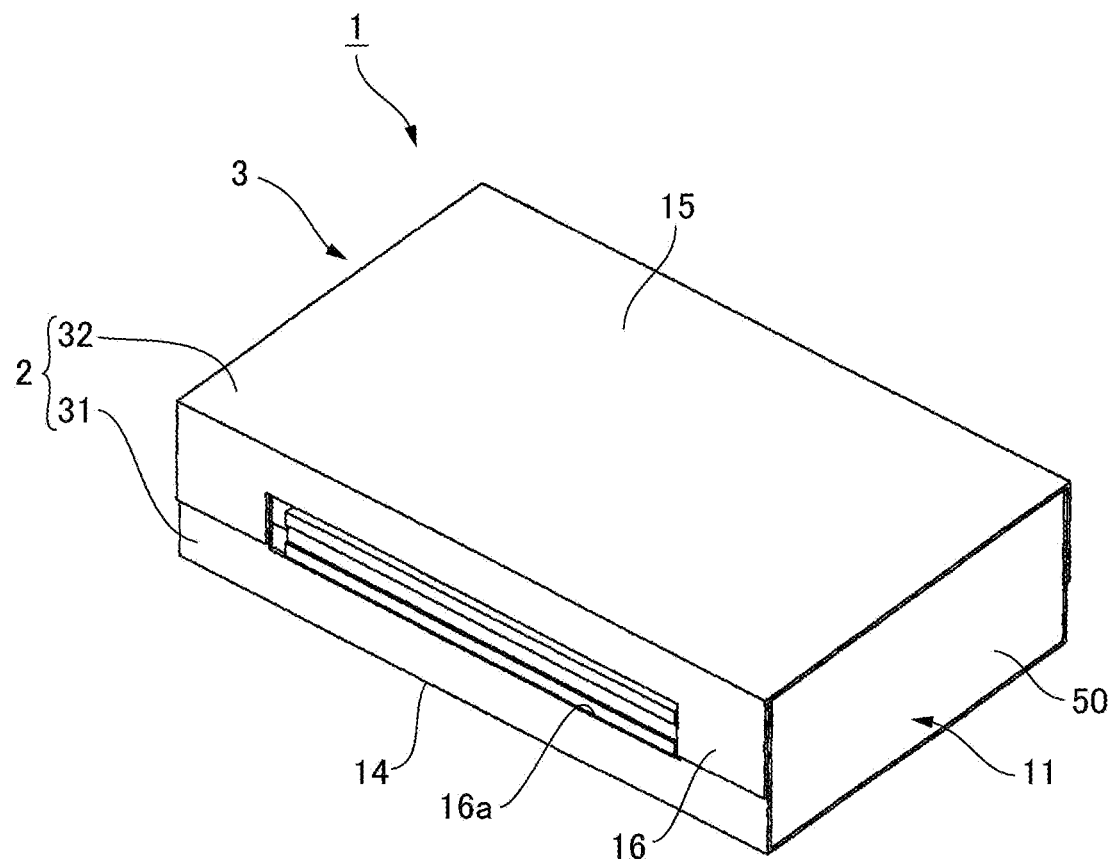
FIG. 2 is a perspective view showing the actuator in FIG. 1 which is viewed from an opposite side in a shorter direction.
Figure 3:
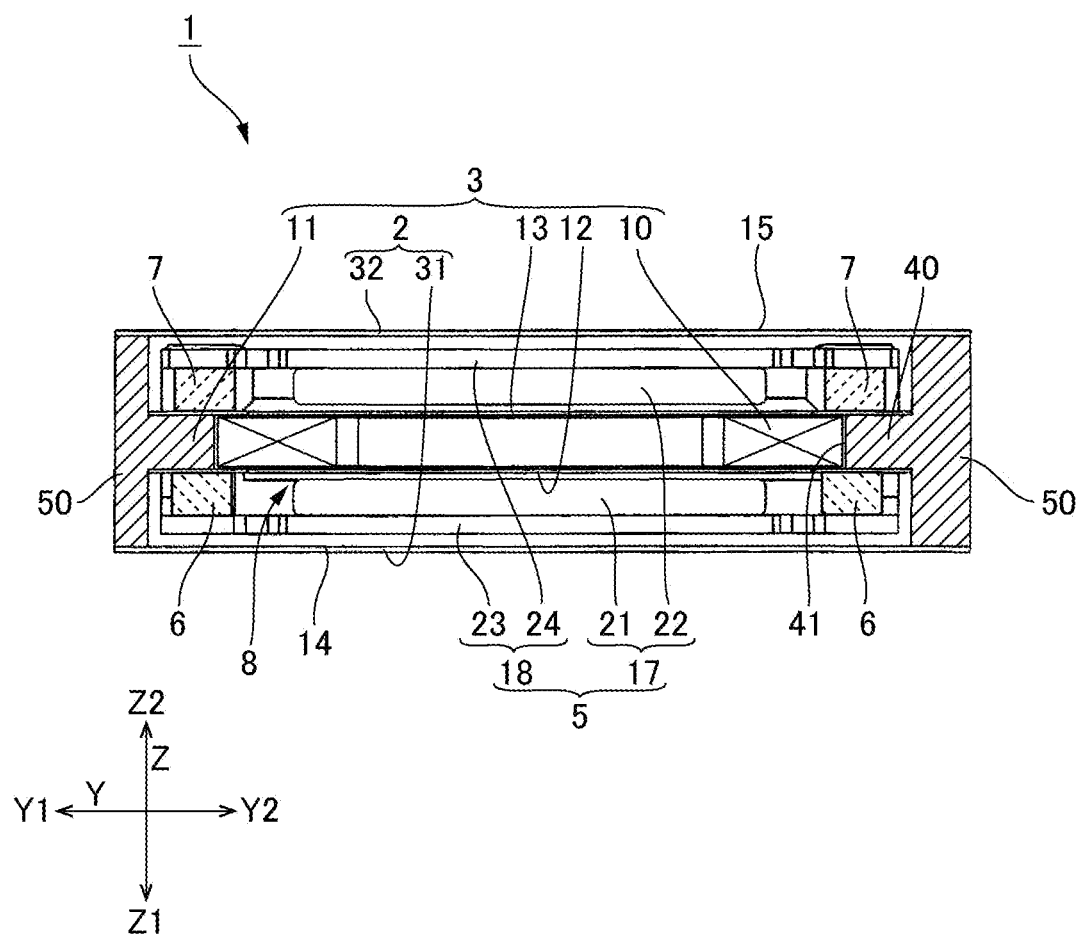
FIG. 3 is a cross-sectional view showing the actuator which is cut in a longitudinal direction.
Figure 4:
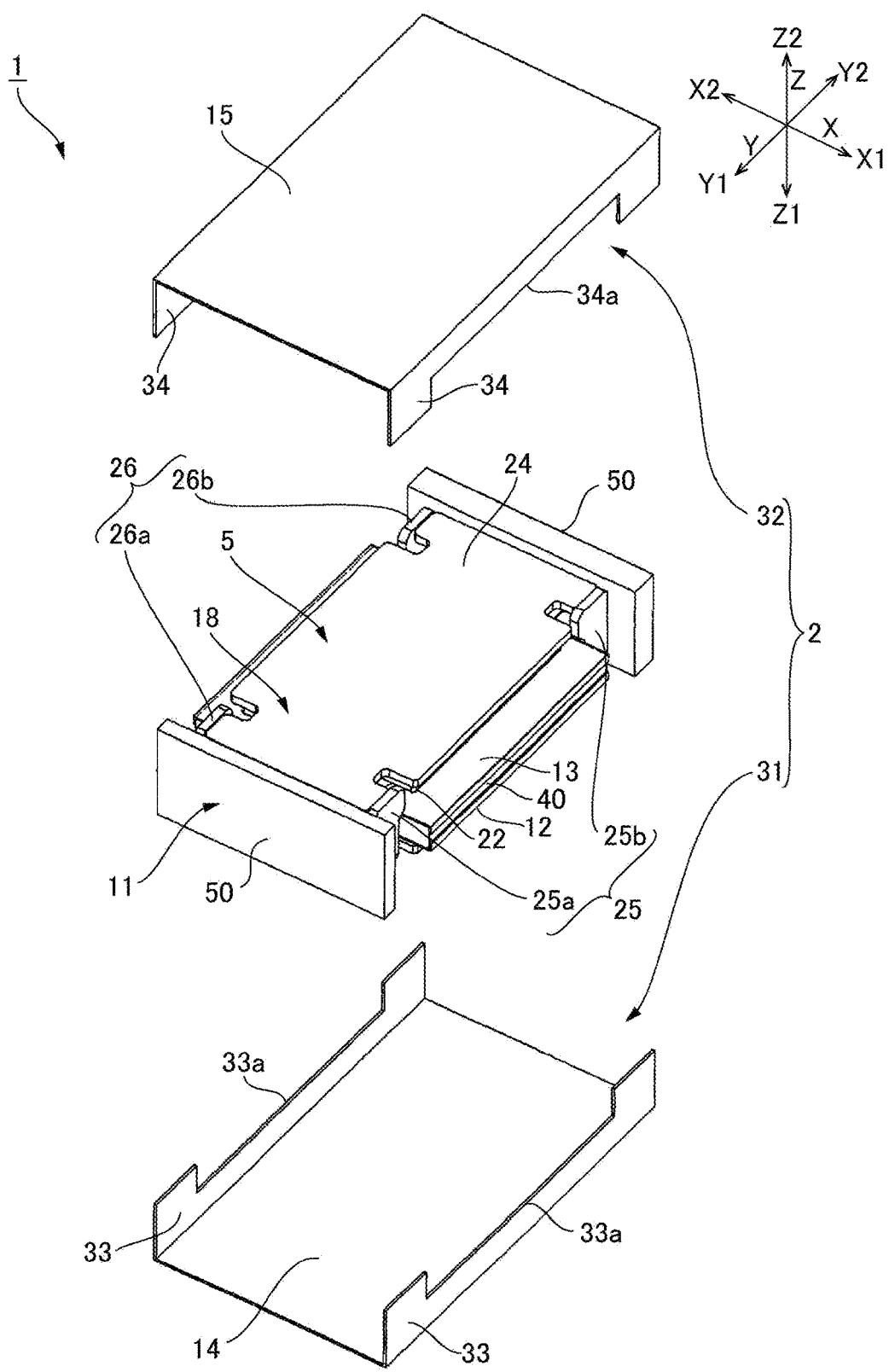
FIG. 4 is an exploded perspective view showing the actuator.
Figure 5:
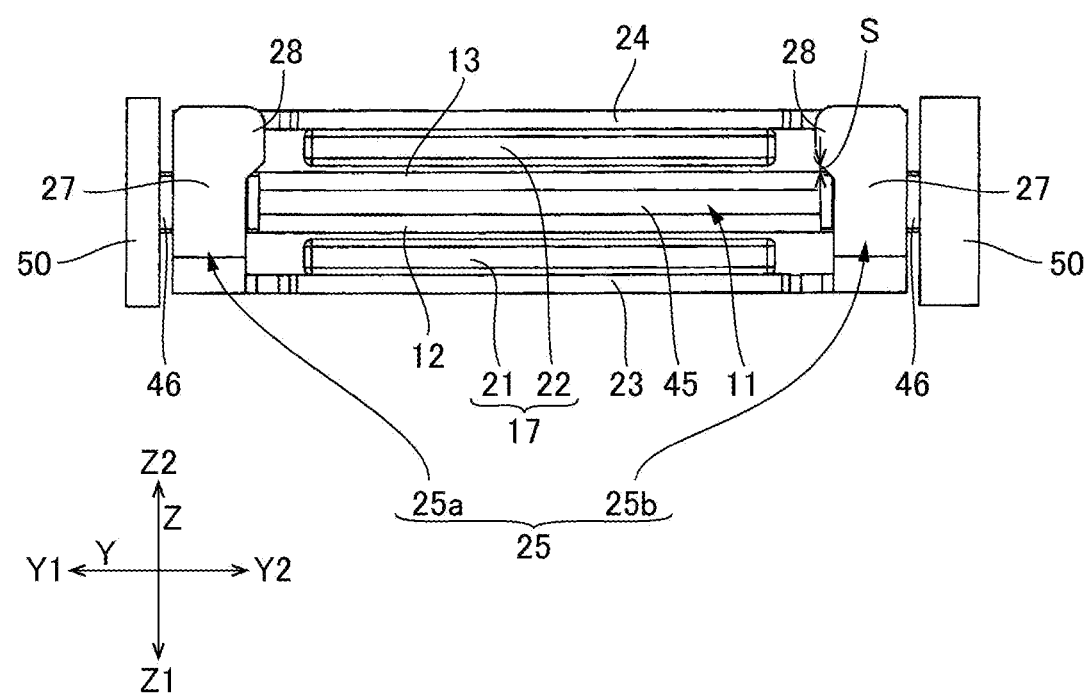
FIG. 5 is a side view showing the actuator in which a case is detached.
Figure 6:
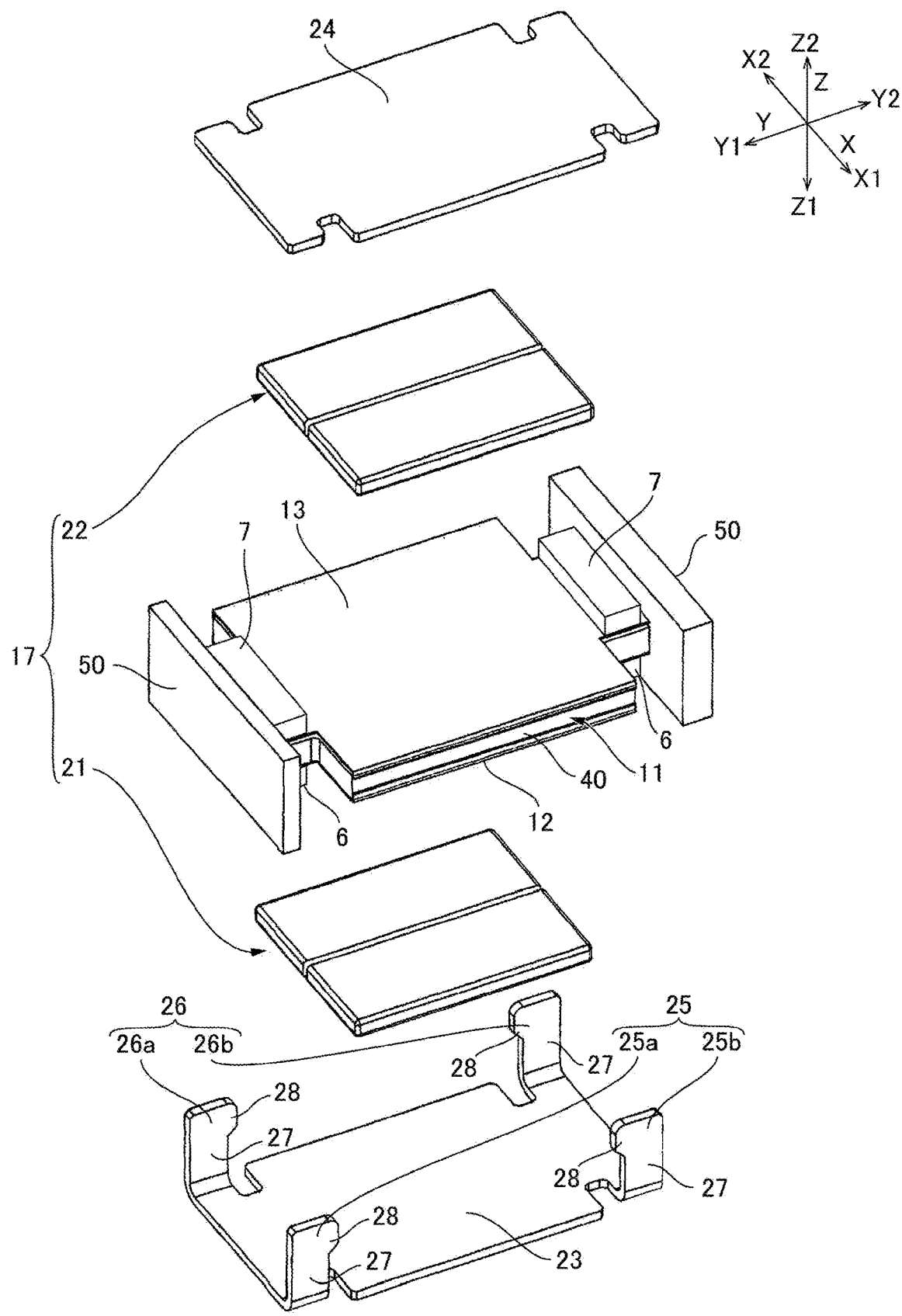
FIG. 6 is an exploded perspective view showing the actuator in which a case is detached.
Figure 7:
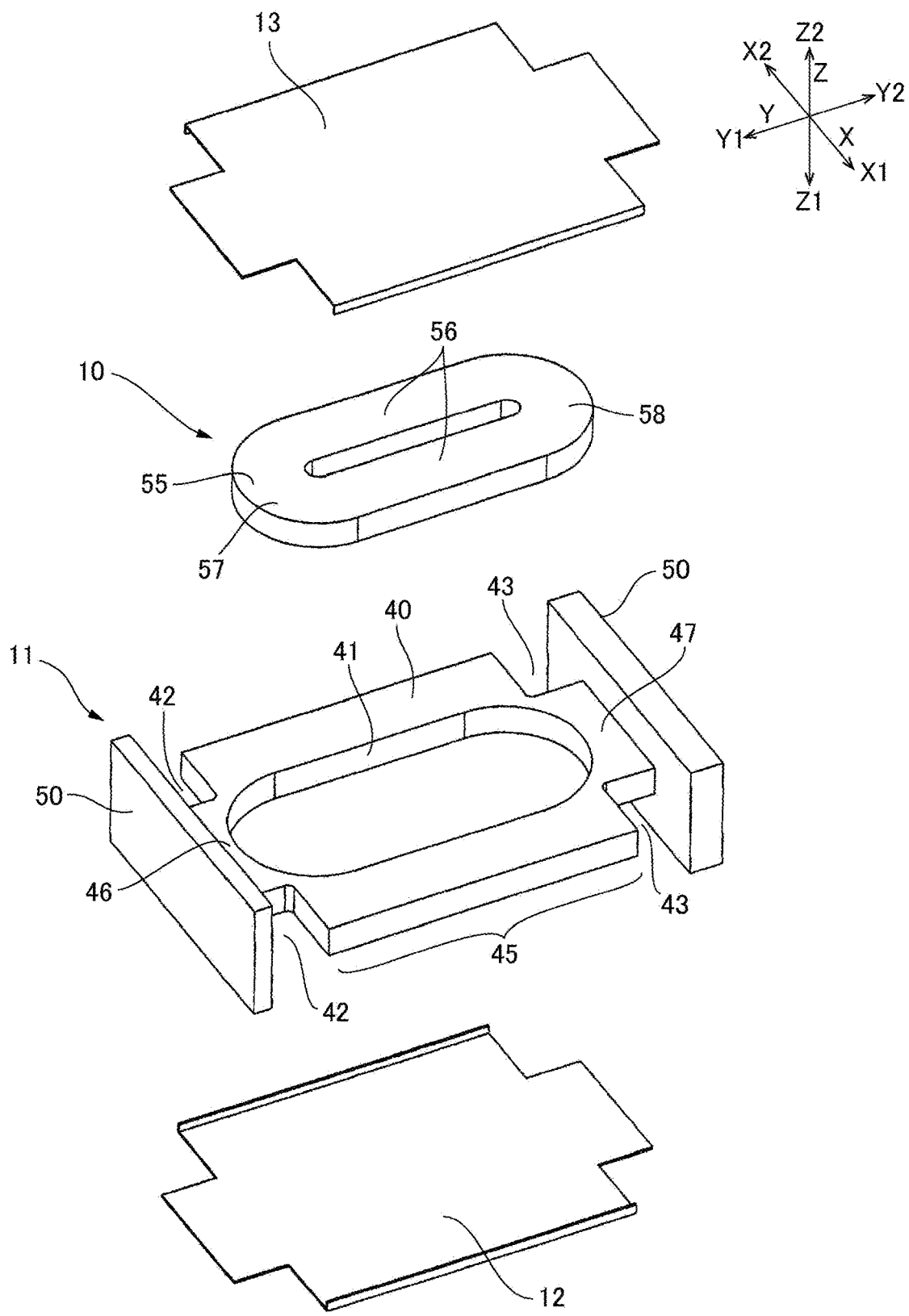
FIG. 7 is an exploded perspective view showing a support body in which a case is detached.
Figure 8:
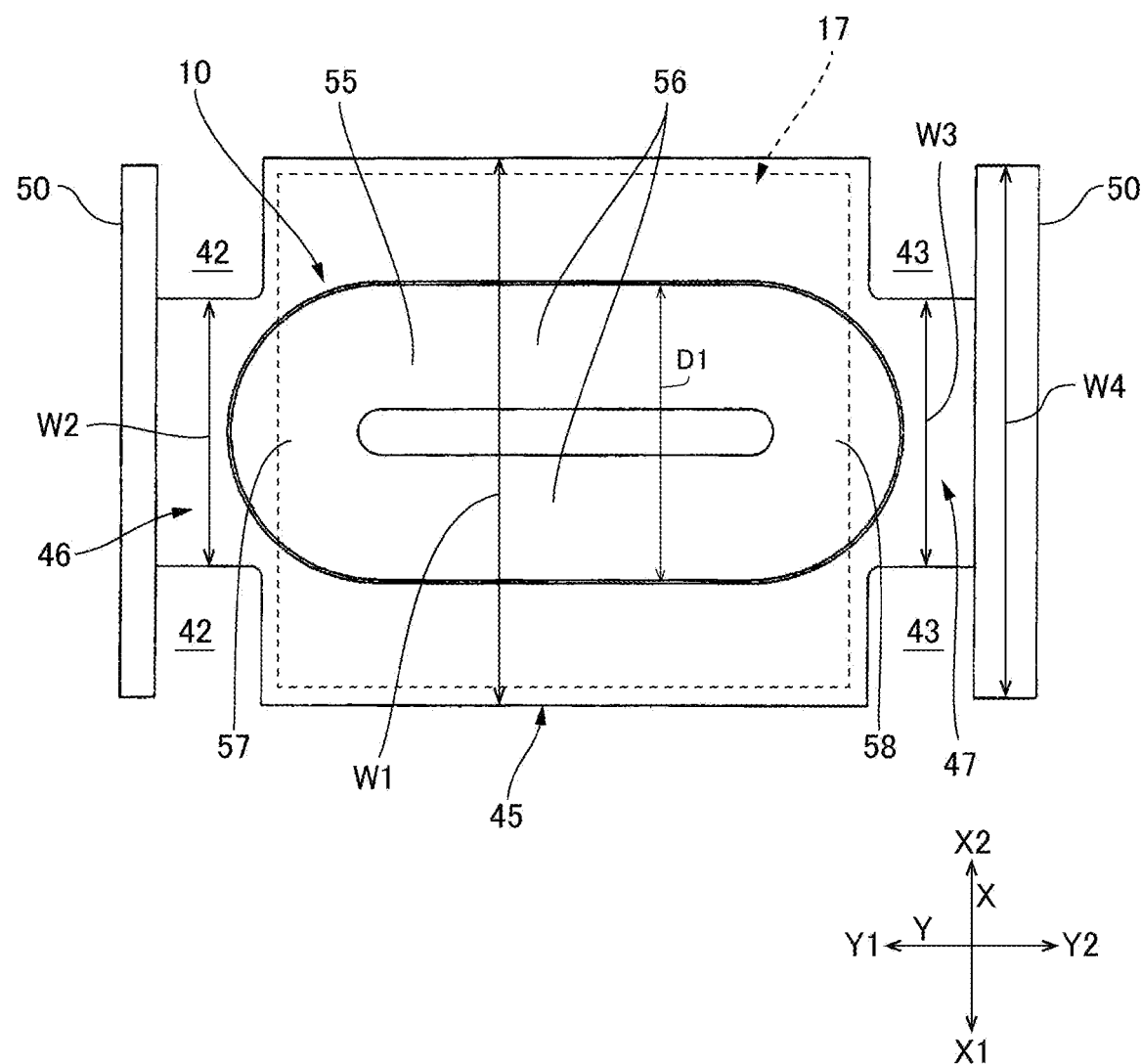
FIG. 8 is a plan view showing a coil holder and a coil.

FIG. 1 is a perspective view showing an actuator to which the present invention is applied. FIG. 2 is a perspective view showing the actuator in FIG. 1 which is viewed from an opposite side in a shorter direction. FIG. 3 is a cross-sectional view showing the actuator which is cut in a longitudinal direction. FIG. 4 is an exploded perspective view showing the actuator. FIG. 5 is a side view showing the actuator in which a case is detached. FIG. 6 is an exploded perspective view showing the actuator in which a case is detached. FIG. 7 is an exploded perspective view showing a support body in which a case is detached. FIG. 8 is a plan view showing a coil holder and a coil.

An actuator 1 in this embodiment is used as a tactile device structured to transmit information by vibration. As shown in FIGS. 1 and 3, the actuator 1 is provided with an outward appearance in a rectangular prism shape. The actuator 1 generates vibration in a shorter direction in the outward appearance. In the following descriptions, the shorter direction in which vibration is generated is defined as an "X" direction (second direction), and a direction which is a longitudinal direction of the actuator 1 and perpendicular to the "X" direction is defined as a "Y" direction (third direction). Further, a direction which is a thickness direction of the actuator 1 and perpendicular to the "X" direction and the "Y" direction is defined as a "Z" direction (first direction). In addition, one side in the "X" direction is referred to as an "X1" direction side, and the other side is referred to as an "X2" direction side. One side in the "Y" direction is referred to as a "Y1" direction side, and the other side is referred to as a "Y2" direction side. One side in the "Z" direction is referred to as a "Z1" direction side, and the other side is referred to as a "Z2" direction side.

As shown in FIG. 3, the actuator 1 includes a support body 3 having a case 2, and a movable body 5 accommodated in an inside of the case 2. Further, the actuator includes connection bodies 6 and 7 which connect the support body 3 with the movable body 5 so as to be relatively movable in the "X" direction, and a magnetic drive mechanism 8 which relatively moves the movable body 5 and the support body 3. A moving direction of the movable body 5 is the "X" direction.

As shown in FIGS. 1 and 2, the case 2 is provided with a first plate part 14 located on the "Z1" direction side with respect to the movable body 5, a second plate part 15 located on the "Z2" direction side with respect to the movable body 5, and a pair of side plate parts 16 which are extended in the "Z" direction on both sides in the "X" direction with respect to the movable body and connect end edges in the "X" direction of the first plate part 14 with end edges in the "X" direction of the second plate part 15. Each of a pair of the side plate parts 16 is provided with a rectangular opening part 16a which is long in the "Y" direction. As shown in FIG. 3, the support body 3 includes a coil 10, a coil holder 11 made of resin which holds the coil 10, a first plate 12 which is overlapped on the "Z1" direction side of the coil holder 11, and a second plate 13 which is overlapped on the "Z2" direction side of the coil holder 11.

As shown in FIG. 7, the coil 10 is provided with a winding part 55 structured by winding a coil wire in an elliptical shape, and two lead parts not shown which are extended from the winding part 55. The winding part 55 is provided with a pair of effective side portions 56 which are arranged in the "X" direction and are extended in the "Y" direction, and a first curved side portion 57 which connects ends on the "Y1" direction side of a pair of the effective side portions 56 and a second curved side portion 58 which connects ends on the "Y2" direction side of a pair of the effective side portions 56. The coil 10 is held by the coil holder 11 in a state that a thickness direction of the winding part 55 is directed toward the "Z" direction. As shown in FIG. 3, the winding part 55 is located at centers in the "X" direction and the "Z" direction in an inside of the case 2.

The movable body 5 includes a magnet 17 and a yoke 18. The magnet 17 faces the winding part 55 of the coil 10 in the "Z" direction. The connection body 6 is disposed between the first plate 12 and the yoke 18. The connection body 7 is disposed between the second plate 13 and the yoke 18. The coil 10 and the magnet 17 structure the magnetic drive mechanism 8 which relatively moves the movable body 5 and the support body 3 in the "X" direction.

(Movable Body)

As shown in FIGS. 5 and 6, the movable body 5 includes, as the magnet 17a, a first magnet 21 and a second magnet 22. The first magnet 21 is located on the "Z1" direction side with respect to the coil 10. The second magnet 22 is located on the "Z2" direction side with respect to the coil 10. Each of the first magnet 21 and the second magnet 22 is polarized into two portions in the "X" direction. A magnetized polarizing line of the first magnet 21 is extended in the "Y" direction at a center in the "X" direction. A magnetized polarizing line of the second magnet 22 is extended in the "Y" direction at a center in the "X" direction.

The yoke 18 is made of magnetic material. As shown in FIGS. 4 and 6, the yoke 18 is provided with a first yoke 23 located on the "Z1" direction side of the first magnet, a second yoke 24 located on the "Z2" direction side of the second magnet, a one side connection yoke 25 which is extended in the "Z" direction on the "X1" direction side with respect to the coil holder 11 and connects the first yoke 23 with the second yoke 24, and the other side connection yoke 26 which is extended in the "Z" direction on the "X2" direction side with respect to the coil holder 11 and connects the first yoke 23 with the second yoke 24. The first magnet 21 is fixed to a center portion of the first yoke 23 in the "Y" direction. The second magnet 22 is fixed to a center portion of the second yoke 24 in the "Y" direction.

The one side connection yoke 25 is provided with a first one side connection yoke 25a and a second one side connection yoke 25b which connect the first yoke 23 with the second yoke 24 on both sides in the "Y" direction with respect to the first magnet 21 and the second magnet 22. The other side connection yoke 26 is provided with a first other side connection yoke 26a and a second other side connection yoke 26b which connect the first yoke 23 with the second yoke 24 on both sides on the "X2" direction side with respect to the first magnet 21 and the second magnet 22.

In this embodiment, the first yoke 23, the first one side connection yoke 25a, the second one side connection yoke 25b, the first other side connection yoke 26a, and the second other side connection yoke 26b are integrally formed as one member. Tip ends on the "Z2" direction side of the first one side connection yoke 25a, the second one side connection yoke 25b, the first other side connection yoke 26a and the second other side connection yoke 26b are respectively connected with four corners of the second yoke 24 by welding.

In this embodiment, as shown in FIGS. 5 and 6, each of the first one side connection yoke 25a, the second one side connection yoke 25b, the first other side connection yoke 26a and the second other side connection yoke 26b is provided with a connecting portion 27, which is extended in the "Z" direction and connects the first yoke 23 with the second yoke 24, and a protruded portion 28 which is protruded toward an inner side in the "Y" direction from an end portion on the "Z2" direction side of the connecting portion 27.

(Support Body)

As shown in FIGS. 1, 2 and 4, the case 2 includes a first case member 31 and a second case member 32 which are overlapped with each other in the "Z" direction. The first case member 31 is attached to the coil holder 11 from the "Z1" direction side. The second case member 32 is attached to the coil holder 11 from the "Z2" direction side. As shown in FIG. 4, the first case member 31 is provided with a first plate part 14 which forms an end face on the "Z1" direction side of the case 2, and a pair of side plate parts 33 which are extended to the "Z2" direction side from both end edges in the "X" direction of the first plate part 14. A cut-out part 33a is provided in a center portion in the "Y" direction at an end edge on the "Z2" direction side of the side plate part 33. The second case member 32 is provided with a second plate part 15 which forms an end face on the "Z2" direction side of the case 2, and a pair of side plate parts 34 which are extended to the "Z1" direction side from both end edges in the "X" direction of the second plate part 15. A cut-out part 34a is provided in a center portion in the "Y" direction at an end edge on the "Z1" direction side of the side plate part 34. A pair of the side plate parts 33 of the first case member 31 and a pair of the side plate parts 34 of the second case member 32 are overlapped with each other in the "Z" direction to structure a pair of the side plate parts 16 of the case 2. The cut-out part 33a provided in the side plate part 33 and the cut-out part 34a provided in the side plate part 34 structure the opening part 16a provided in the side plate part 16 of the case 2.

As shown in FIG. 7, the coil holder 11 is provided with a plate part 40 whose thickness direction is directed in the "Z" direction. The plate part 40 is provided with a coil arrangement hole 41 in a shape into which the winding part 55 of the coil 10 is fitted in a center portion in the "X" direction and the "Y" direction when viewed in the "Z" direction. The winding part 55 of the coil 10 is accommodated in the coil arrangement hole 41 and is fixed to the coil holder 11 by an adhesive. Further, the plate part 40 is provided with a pair of first cut-out parts 42 which are recessed to an inner side from an end edge on the "X1" direction side and an end edge on the "X2" direction side of the plate part 40 in an end portion on the "Y1" direction side. In addition, the plate part 40 is provided with a pair of second cut-out parts 43 which are recessed to an inner side from the end edge on the "X1" direction side and the end edge on the "X2" direction side of the plate part 40 in an end portion on the "Y2" direction side. As a result, the plate part 40 is provided with a first portion 45 located between a pair of the first cut-out parts 42 and a pair of the second cut-out parts 43 in the "Y" direction, a second portion 46 located between a pair of the first cut-out parts 42 in the "X" direction, and a third portion 47 located between a pair of the second cut-out parts 43 in the "X" direction.

In this embodiment, as shown in FIG. 8, a first width "W1" in the "X" direction of the first portion 45 is wider than a second width "W2" of the second portion 46 and a third width "W3" of the third portion 47. The second width "W2" and the third width "W3" are the same as each other. Further, the second width "W2" and the third width "W3" is smaller than an inside diameter "D1" in the "X" direction of the coil arrangement hole 41 in the first portion 45. In addition, when a state that the winding part 55 of the coil 10 is accommodated in the coil arrangement hole 41 is viewed in the "X" direction, the first portion 45 is overlapped with a pair of the effective side portions 56 of the winding part 55. Each of a pair of the first cut-out parts 42 is overlapped with the first curved side portion 57 of the winding part 55. Each of a pair of the second cut-out parts 43 is overlapped with the second curved side portion 58 of the winding part 55.

Further, the coil holder 11 is provided with a pair of wall parts 50 which sandwich the plate part 40 from both sides in the "Y" direction. A shape of the wall part 50 is rectangular when viewed in the "Y" direction. As shown in FIGS. 1 and 2, a pair of the wall parts 50 are fitted to openings at both ends in the "Y" direction of the case 2 in a rectangular tube shape. As shown in FIG. 8, a length dimension "W4" in the "X" direction of the wall part 50 is shorter than the first width "W1" of the first portion 45 of the plate part 40 and is longer than the second width "W2" of the second portion 46 and the third width "W3" of the third portion 47.

As shown in FIGS. 6 and 7, the first plate 12 is overlapped with an end face on the "Z1" direction side of the plate part 40 to close the coil arrangement hole 41. The first plate 12 is provided with a shape corresponding to a contour shape of the plate part 40 and covers an entire end face on the "Z1" direction side of the plate part 40. The first plate 12 is fixed to the plate part 40 by an adhesive. The second plate 13 is overlapped with an end face on the "Z2" direction side of the plate part 40 to close the coil arrangement hole 41. The second plate 13 is provided with a shape corresponding to the contour shape of the plate part 40 and covers an entire end face on the "Z2" direction side of the plate part 40. The second plate 13 is fixed to the plate part 40 by an adhesive.

(Connection Body)

Each of the connection bodies 6 and 7 is formed in a rectangular prism shape which is extended long in the "X" direction. The connection body 6 is disposed between the first yoke 23 and the first plate 12. More specifically, the connection body 6 is structured of two members having the same shape, which are sandwiched at two positions between an end portion on the "Y1" direction side of the first yoke 23 and an end portion on the "Y1" direction side of the first plate 12, and between an end portion on the "Y2" direction side of the first yoke 23 and an end portion on the "Y2" direction side of the first plate 12. The connection body 7 is disposed between the second yoke 24 and the second plate 13. More specifically, the connection body 7 is structured of two members having the same shape, which are sandwiched at two positions between an end portion on the "Y1" direction side of the second yoke 24 and an end portion on the "Y1" direction side of the second plate 13, and between an end portion on the "Y2" direction side of the second yoke 24 and an end portion on the "Y2" direction side of the second plate 13. Each of the connection bodies 6 and 7 is a gel member made of silicone gel. The connection bodies 6 and 7 are provided in a state compressed in the "Z" direction between the support body 3 and the movable body 5.

In this embodiment, in a state that the movable body 5 is supported by the support body 3 through the connection bodies 6 and 7, the winding part 55 of the coil 10 held by the plate part 40 of the coil holder 11 is located between the first magnet 21 and the second magnet 22 in the "Z" direction. When this state is viewed in the "Z" direction, a pair of the effective side portions 56 of the winding part 55 face the first magnet 21 on the "Z1" direction side and faces the second magnet 22 on the "Z2" direction side.

Further, the first one side connection yoke 25a and the first other side connection yoke 26a of the yoke 18 are respectively inserted into a pair of the first cut-out parts 42 of the coil holder 11. The second one side connection yoke 25b and the second other side connection yoke 26b of the yoke 18 are respectively inserted into a pair of the second cut-out parts 43. As a result, the respective connecting portions 27 of the first one side connection yoke 25a, the second one side connection yoke 25b, the first other side connection yoke 26a and the second other side connection yoke 26b are extended in the "Z" direction on the inner sides of the cut-out parts 42 and 43. Further, the respective protruded portions 28 of the first one side connection yoke 25a, the second one side connection yoke 25b, the first other side connection yoke 26a and the second other side connection yoke 26b are protruded to a side of the first portion 45 of the coil holder 11. Each of the protruded portions 28 faces the second plate 13 fixed to the coil holder 11 with a predetermined gap space "S" therebetween in the "Z" direction as shown in FIG. 5.

When a state that the movable body 5 is supported by the support body 3 through the connection bodies 6 and 7 is viewed in the "X" direction, as shown in FIGS. 4 and 5, the one side connection yoke 25 and the other side connection yoke 26 are located at positions where they are not overlapped with the first portion 45 of the coil holder 11. Therefore, the one side connection yoke 25 and the other side connection yoke 26 are located at positions so as not to overlap with the effective side portions 56 of the coil 10 and the magnets 21 and 22.

Further, as shown in FIGS. 1 and 2, both end edges of the first portion 45 of the coil holder 11 are inserted into the opening parts 16a formed in a pair of the side plate parts 16 of the case 2.

(Operation)

When an electric current is supplied to the coil 10 in a predetermined direction, the movable body 5 supported by the support body 3 is moved to one side in the "X" direction. After that, when a direction of the electric current is reversed, the movable body 5 is moved to the other side in the "X" direction. The movable body 5 is vibrated by repeating reversal of a direction of an electric current supplied to the coil 10.

(Operations and Effects)

The actuator 1 in this embodiment includes, as the magnet 17 structuring the magnetic drive mechanism 8 together with the coil 10, the first magnet 21 located on one side in the "Z"

direction with respect to the coil 10, and the second magnet 22 located on the other side with respect to the coil 10. Further, the actuator 1 includes, as the yoke 18, the first yoke 23 located on an opposite side of the first magnet 21 with respect to the coil 10, the second yoke 24 located on an opposite side of the second magnet 22 with respect to the coil 10, the one side connection yoke 25 which is extended in the "Z" direction on the "X1" direction side of the coil holder 11 and connects the first yoke 23 with the second yoke 24, and the other side connection yoke 26 which is extended in the "Z" direction on the "X2" direction side of the coil holder 11 and connects the first yoke 23 with the second yoke 24. According to this structure, magnetic flux from the first magnet 21 and magnetic flux from the second magnet 22 flow so as to surround the coil 10 according to a shape of the yoke 18. As a result, the magnetic flux from the magnet 17 is restrained from leaking to the outside of the yoke 18 and thus, the magnetic drive mechanism 8 of the actuator 1 is capable of easily obtaining thrust which relatively moves the support body 3 and the movable body 5.

In this embodiment, the one side connection yoke 25 and the other side connection yoke 26 are provided at positions so as not to overlap with the effective side portions 56 of the coil 10 and the magnets 21 and 22 when viewed in the "X" direction. Therefore, in order to increase an area of the effective side portions 56 of the coil 10 facing the magnets 21 and 22, even in a case that a coil 10 which is larger in the "X" direction than a conventional coil is mounted on the coil holder 11 and that the coil arrangement hole 41 provided in the coil holder 11 is increased in the "X" direction by an amount that the coil 10 is increased in the "X" direction, the one side connection yoke 25 and the other side connection yoke 26 are not required to be separated from each other in the "X" direction. Therefore, even in a case that a large coil 10 is mounted as the coil 10 of the magnetic drive mechanism 8, the actuator 1 is prevented or restrained from enlarging in the "X" direction.

Further, in this embodiment, the one side connection yoke 25 is provided with the first one side connection yoke 25a and the second one side connection yoke 25b which connect the first yoke 23 with the second yoke 24 on both sides in the "Y" direction with respect to the magnets 21 and 22. Further, the other side connection yoke 26 is provided with the first other side connection yoke 26a and the second other side connection yoke 26b which connect the first yoke 23 with the second yoke 24 on both sides in the "Y" direction with respect to the magnets 21 and 22. Therefore, the one side connection yoke 25 which connects the first yoke 23 with the second yoke 24 is provided with two connection yokes, and the other side connection yoke 26 is provided with two connection yokes. Accordingly, magnetic flux from the first magnet 21 and magnetic flux from the second magnet 22 are capable of easily flowing so as to surround the coil 10.

Further, the first one side connection yoke 25a and the first other side connection yoke 26a are overlapped with the first curved side portion 57 when viewed in the "X" direction, and the second one side connection yoke 25b and the second other side connection yoke 26b are overlapped with the second curved side portion 58 when viewed in the "X" direction. Therefore, two yokes of the first one side connection yoke 25a and the second one side connection yoke 25b structuring the one side connection yoke 25 are prevented from excessively separating from each other in the "Y" direction. Further, two yokes of the first other side connection yoke 26a and the second other side connection yoke 26b structuring the other side connection yoke 26 are prevented from excessively separating from each other in the "Y" direction. Accordingly, a size of the actuator 1 is prevented or restrained from increasing in the "Y" direction.

In addition, in this embodiment, the plate part 40 of the coil holder 11 is provided with a pair of the first cut-out parts 42 which are recessed to an inner side from both end edges in the "X" direction of the plate part 40 at positions overlapping with the first curved side portion 57 of the winding part 55 of the coil 10 when viewed in the "X" direction. Further, the plate part 40 of the coil holder 11 is provided with a pair of the second cut-out parts 43 which are recessed to an inner side from both end edges in the "X" direction of the plate part 40 at positions overlapping with the second curved side portion 58 of the winding part 55 when viewed in the "X" direction. Further, each of the first one side connection yoke 25a and the first other side connection yoke 26a is inserted into each of the first cut-out parts 42, and each of the second one side connection yoke 25b and the second other side connection yoke 26b is inserted into each of the second cut-out parts 43. Therefore, a distance between the first one side connection yoke 25a and the first other side connection yoke 26a can be reduced in the "X" direction by an amount that they are inserted to an inner side of a pair of the first cut-out parts 42. Further, a distance between the second one side connection yoke 25b and the second other side connection yoke 26b can be reduced in the "X" direction by an amount that they are inserted to an inner side of a pair of the second cut-out parts 43. Therefore, even in a case that the one side connection yoke 25 and the other side connection yoke 26 are located on an outer side with respect to the coil holder 11 in the "X" direction, the movable body 5 is easily restrained from enlarging in the "X" direction.

Further, in the plate part 40, the first width "W1" in the "X" direction of the first portion 45 located between a pair of the first cut-out parts 42 and a pair of the second cut-out parts 43 in the "Y" direction is wider than the second width "W2" in the "X" direction of the second portion 46 located between a pair of the first cut-out parts 42 in the "X" direction and the third width "W3" in the "X" direction of the third portion 47 located between a pair of the second cut-out parts 43 in the "X" direction. In addition, the second width "W2" and the third width "W3" are smaller than an inside diameter in the "X" direction of the coil arrangement hole 41 in the first portion 45. As a result, in the first portion 45, a portion of the coil arrangement hole 41 where the effective side portions 56 of the coil 10 is accommodated can be increased in the "X" direction. Therefore, a size of the coil 10 is easily increased in the "X" direction.

In this embodiment, the support body 3 includes the second plate 13 in a flat plate shape which is overlapped with an end face on the other side of the plate part 40 in the "Z" direction to close the coil arrangement hole 41. The first one side connection yoke 25a, the second one side connection yoke 25b, the first other side connection yoke 26a and the second other side connection yoke 26b are respectively provided with the connecting portions 27, which are extended in the "Z" direction on the inner sides of the respective cut-out parts 42 and 43 and connect the first yoke 23 with the second yoke 24, and the protruded portions 28 each of which is protruded from an end portion on the second yoke 24 side toward the first portion 45 in the "Y" direction and faces the second plate 13 with a predetermined gap space "S" therebetween in the "Z" direction. Therefore, in a case that the movable body 5 is excessively inclined in the "X" direction when the movable body 5 is moved, the second plate 13 of the support body 3 is abutted with the protruded portion 28 of the first one side connection yoke 25a or the protruded portion 28 of the first other side connection yoke 26a. Alternatively, the second plate 13 of the support body 3 is abutted with the protruded portion 28 of the second one side connection yoke 25b or the protruded portion 28 of the second other side connection yoke 26b. Therefore, the movable body 5 can be prevented from excessively inclining in the "X" direction. Further, in a case that the movable body 5 is excessively inclined in the "Y" direction when the movable body 5 is moved in the "X" direction, the second plate 13 of the support body 3 is abutted with the protruded portion 28 of the first one side connection yoke 25a or the protruded portion 28 of the second one side connection yoke 25b. Alternatively, the second plate 13 of the support body 3 is abutted with the protruded portion 28 of the first other side connection yoke 26a or the protruded portion 28 of the second other side connection yoke 26b. Therefore, when the movable body 5 is moved in the "X" direction, the movable body 5 can be prevented from excessively inclining in the "Y" direction.

Further, the support body 3 includes the case 2 in a tube shape which is provided with the first plate part 14 located on one side in the "Z" direction with respect to the coil holder 11 and the movable body 5, the second plate part 15 located on the other side with respect to the coil holder 11 and the movable body 5, and a pair of the side plate parts 16 which are extended in the "Z" direction and connect both end edges in the "X" direction of the first plate part 14 with both end edges in the "X" direction of the second plate part 15. Each of a pair of the side plate parts 16 is provided with the opening part 16a penetrating through in the "X" direction. Both end portions in the "X" direction of the first portion 45 of the coil holder 11 are inserted into a pair of the opening parts 16a. Therefore, in comparison with a case that the coil holder 11 is accommodated between a pair of the side plate parts 16, a size of the first portion 45 of the coil holder 11 can be increased in the "X" direction by at least an amount of a thickness of a pair of the side plate parts 16 of the case 2. Therefore, the coil arrangement hole 41 for holding the coil 10 whose size in the "X" direction is large is easily provided in the coil holder 11.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
   a support body comprising a coil and a coil holder which holds the coil;
   a movable body comprising a magnet facing the coil and a yoke to which the magnet is fixed;
   a connection body which relatively movably connects the movable body with the support body; and
   a magnetic drive mechanism comprising the coil and the magnet to move the support body and the movable body relatively;
   wherein in a case that a direction where the coil and the magnet face each other is defined as a first direction, a direction where the movable body and the support body are relatively moved is defined as a second direction which is perpendicular to the first direction, and a direction perpendicular to the first direction and the second direction is defined as a third direction,
   a winding part of the coil comprises:
      a pair of effective side portions which are arranged in the second direction and extended in the third direction;
      a first curved side portion which connects one side ends in the third direction of the pair of the effective side portions; and
      a second curved side portion which connects other side ends in the third direction of the pair of the effective side portions;
   the magnet faces the pair of the effective side portions and comprises:
      a first magnet located on one side with respect to the coil in the first direction; and
      a second magnet located on an other side with respect to the coil in the first direction;
   the yoke comprises:
      a first yoke located on an opposite side of the first magnet with respect to the coil;
      a second yoke located on an opposite side of the second magnet with respect to the coil;
      a one side connection yoke which is extended in the first direction on one side in the second direction of the coil holder to connect the first yoke with the second yoke; and
      an other side connection yoke which is extended in the first direction on an other side in the second direction of the coil holder to connect the first yoke with the second yoke; and
   the one side connection yoke and the other side connection yoke are provided at positions so as not to overlap with the effective side portions and the magnet when viewed in the second direction.

2. The actuator according to claim 1, wherein
   the one side connection yoke comprises a first one side connection yoke and a second one side connection yoke which are provided on both sides in the third direction with respect to the magnet and connect the first yoke with the second yoke, and
   the other side connection yoke comprises a first other side connection yoke and a second other side connection yoke which are provided on both sides in the third direction with respect to the magnet and connect the first yoke with the second yoke.

3. The actuator according to claim 2, wherein
   the first one side connection yoke and the first other side connection yoke are overlapped with the first curved side portion when viewed in the second direction, and
   the second one side connection yoke and the second other side connection yoke are overlapped with the second curved side portion when viewed in the second direction.

4. The actuator according to claim 2, wherein
   the coil holder comprises a plate part whose thickness direction is directed in the first direction and a coil arrangement hole provided in the plate part,
   the coil arrangement hole is formed in a shape so that the winding part is fitted when viewed in the first direction,
   the winding part is accommodated in the coil arrangement hole,
   the plate part comprises:
      a pair of first cut-out parts which are recessed to an inner side from both end edges in the second direction at positions overlapping with the first curved side portion when viewed in the second direction; and a pair of second cut-out parts which are recessed to an inner side from both end edges in the second direction at positions overlapping with the second curved side portion when viewed in the second direction, each of the first one side connection yoke and the first other side connection yoke is inserted into each of the first cut-out parts, and each of the second one side connection yoke and the second other side connection yoke is inserted into each of the second cut-out parts.

5. The actuator according to claim 4, wherein a first width in the second direction of a first portion of the plate part located between the pair of the first cut-out parts and the pair of the second cut-out parts in the third direction is wider than a second width in the second direction of a second portion located between the pair of the first cut-out parts in the second direction and a third width in the second direction of a third portion located between the pair of the second cut-out parts in the second direction, and the second width and the third width are smaller than an inside diameter in the second direction of the coil arrangement hole in the first portion.

6. The actuator according to claim 4, wherein the support body comprises a plate in a flat plate shape which is overlapped with an end face on an other side in the first direction of the plate part to close the coil arrangement hole, each of the first one side connection yoke and the first other side connection yoke comprises:
  a connecting portion which is extended in the first direction on an inner side of the first cut-out part to connect the first yoke with the second yoke; and
  a protruded portion which is protruded from an end portion of the connecting portion on a side of the second yoke toward the first portion in the third direction and faces the plate with a predetermined gap space therebetween in the first direction.

7. The actuator according to claim 4, wherein the support body comprises a case in a tube shape which comprises:
  a first plate part which is located on one side in the first direction with respect to the coil holder and the movable body;
  a second plate part which is located on an other side in the first direction with respect to the coil holder and the movable body; and
  a pair of side plate parts which are extended in the first direction to respectively connect both end edges in the second direction of the first plate part with both end edges in the second direction of the second plate part, each of the pair of the side plate parts comprises an opening part which penetrates in the second direction, and both end portions in the second direction of the first portion are inserted into the opening parts.

* * * * *